May 26, 1970 R. A. PARADIS ET AL 3,513,503

COOLING APPARATUS

Filed Dec. 4, 1967

INVENTORS
ROBERT A. PARADIS
ANTHONY M. MIERZWA

BY

Roy L. Davis
ATTORNEY

United States Patent Office 3,513,503
Patented May 26, 1970

3,513,503
COOLING APPARATUS

Robert A. Paradis, Painesville, and Anthony M. Mierzwa, North Madison, Ohio, assignors to Diamond Shamrock Corporation, a corporation of Delaware Filed Dec. 4, 1967, Ser. No. 687,874
Int. Cl. B29f 3/08
U.S. Cl. 18—12 2 Claims

ABSTRACT OF THE DISCLOSURE

A method is described whereby shaped articles as fabricated from thermoplastic resins by extrusion are differentially cooled in order to selectively eliminate bowing or distortion therefrom. During the initial stages of the cooling method when the shaped article is in a very soft, heat-plasticized condition, only predetermined sections thereof are contacted with a fine atomized spray of fluid cooling medium so that these sections, if desired, may be cooled at a rate equal to the other sections of the shaped article. During the latter stages of the cooling method, selective spraying is not usually necessary for eliminating undesirable bowing, and all surfaces of the shaped article optionally may be sprayed, as desired. Apparatus adapted for carrying out the differential cooling method is also described.

BACKGROUND OF THE INVENTION

The present invention relates to shaped plastic articles fabricated by extrusion methods from thermoplastic resin compositions. More particularly, it relates to an apparatus for progressively or differentially cooling shaped thermoplastic extrudates whereby non-distored, perfectly sized finished plastic articles are obtained.

It is known to prepare from thermoplastic resin materials, shaped plastic articles of varying size and configuration by extrusion methods. Such articles are commonly designated in the art as "extruded profiles" or "shaped profiles," and the method for obtaining them is known as "profile extrusion." Methods employed heretofore to cool these shaped articles after extrusion have generally involved passing them through water baths or contacting the surface thereof with water sprays or with pressurized air streams or jets. None of these cooling techniques have proved to be completely satisfactory, however. The use of water baths or water sprays tends to promote permanent water spotting on the surface of the extruded shape. The use of pressurized air streams have not proved efficient for providing the uniform accelerated cooling needed for shaped profiles of more complicated or intricate configuration. None of these cooling methods have proved satisfactory for providing the uniform accelerated cooling necessary to efficiently cool the extremely hot, soft shaped profiles extruded from thermoplastic resins in the form of powders, particularly such resin compositions which contain little or no plasticizing liquid.

SUMMARY OF THE INVENTION

It is the object of this invention, therefore, to provide an efficient apparatus for cooling shaped articles resulting from the profile extrusion of thermoplastic resin compositions whereby nondistorted, non-bowed and non-warped finished shaped profiles are obtained as desired.

It is another object to provide a cooling apparatus for the production of non-distorted extruded profile shapes as desired from thermoplastic resin compositions, which method is not intended to vary the wall thickness of said profile shapes so that the finished cooled shapes have substantially the same size as extruded.

It is a further object to eliminate undesirable distortion or bowing in extruded shaped profiles as fabricated from thermoplastic resins formulated as rigid resin powder compositions.

These and other objects of the invention will be apparent from the disclosure as set forth hereinafter.

The present invention comprises an apparatus for progressively or differentially cooling an extruded profile fabricated from a thermoplastic resin composition, which may be either a compound or a dry blended powder material, which method comprises contacting particularly during the initial cooling stages thereof, only certain surfaces of said shaped profile with a fine mist or atomized spray of a fluid medium, e.g., water, as said shaped profile travels axially in an unrestricted path from the shaping die toward the receiving or collecting station of the extrusion line.

By thus contacting and selectively cooling only some of the profile surfaces, it has been found that undesired bowing of the piece as evidenced heretofore in presently practiced cooling methods is eliminated. Further, by utilizing the cooling medium as a fine mist or atomized spray, permanent water spotting on the surface of the shaped article is not developed.

BRIEF DESCRIPTION OF THE DRAWINGS

In the accompanying drawings which illustrate one embodiment of the invention.

DESCRIPTION OF THE PREFERRED EMBODIMENTS

Figure 1:
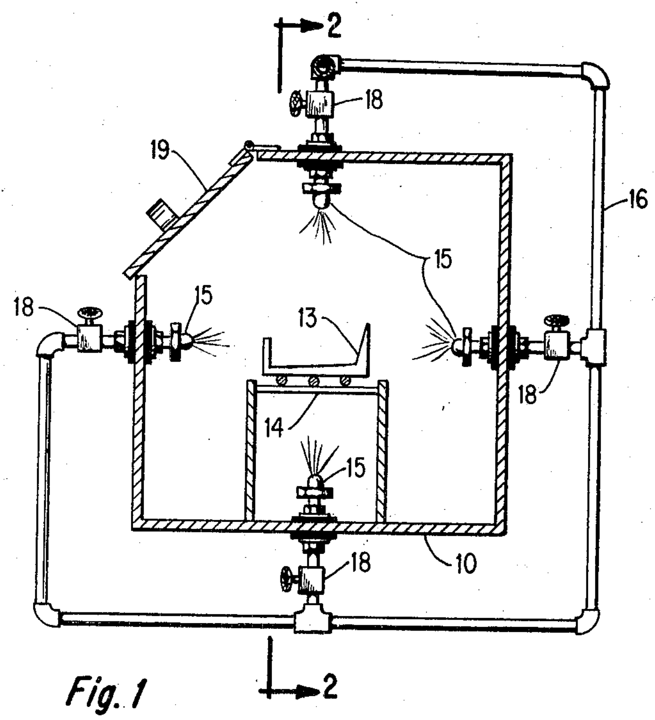
FIG. 1 is an end-view in elevation with parts broken away of one modification of a cooling chamber essentially of rectangular configuration, looking into the chamber in the direction in which the extruded profile travels therethrough, the spray nozzles and the pipe manifold connected therewith being omitted beyond the first series.

The thermo plastic resins which suitably may be extruded to form the shaped profiles differentially cooled in the practice of this invention include polyolefin, e.g., ethylene or propylene homo- and copolymers, vinyl halide, e.g., vinyl chloride, vinyl fluoride etc. homo- and copolymers, styrene homo- and copolymers such as impact polystyrene, ABS terpolymers or styrene-acrylonitrile copolymers, polycarbonates, polysulfonates, polyphenylene oxides, linear polyamides and also blends of any of these polymers and copolymers. Also suitable are other extrudable thermoplastic resins and blends thereof known and used in the art. Presently preferred for use in the practice of this invention are polyvinyl chloride homo- and copolymer formulations, which are powder compositions, particularly such dryblended materials which are rigid resin powders.

As used here in the specification and claims the terms "resin powder" and "resin powder composition" are intended to refer to an intimate physical mixture of any of the above described thermoplastic resins with minor quantities of ingredients such as heat and light stabilizers for the resin, impact modifiers and processing aids therefor, fillers, pigments, etc., which materials normally are compounded with such resins as needed to provide the desired physical and chemical properties to finished articles fabricated therefrom. These resin mixtures which are commonly known as "dryblends" or "powder blends" are prepared by a simple dryblending procedure.

As used herein, the term "resin compound" refers to similar resin formulations which have been converted at high shear rates to fused, solid resinous masses which are then subsequently ground, diced or otherwise reduced to workable form prior to processing.

Likewise, the term "rigid" as applied to both the thermoplastic resin powder blends and compounds employed herein in the practice of this invention refers to those formulations wherein the resin modifying ingredients employed do not usually include organic liquids designated in the art as plasticizers. For some specialized applications, however, rigid resin compositions employed herein may contain minor quantities, i.e., up to 10% based on the weight of the composition of an organic liquid plasticizer. Thus, it is to be understood that a resin composition containing up to 10% by weight of an organic liquid plasticizer is within the scope of the present invention.

In the cooling method of the present invention, the fluid medium, e.g. water, as a fine mist or atomized spray is discharged from a plurality of nozzles onto certain surfaces of the profile after its emergence from the extruder die. The nozzles are spaced in series in a cooling chamber with the tips thereof projecting into the chamber, each series of said nozzles being positioned preferably above, below and on each lateral side of the path traversed by the profile. The nozzles themselves are of a type available commercially which delivers a mechanically broken, uniformly distributed atomized spray of water. Each nozzle is equipped with a valve for diminishing or completely shutting off the water spray as desired. Depending upon the configuration of the particular shaped profile being fabricated which, of course, governs the type of differential cooling to be applied thereto to eliminate undesired bowing, the profile is contacted on certain predetermined surfaces with the water mist, e.g. on only its top and bottom surfaces, on only its lateral surfaces, etc. This differential cooling technique which is established by experimentation for each particular profile being fabricated, is especially critical during the initial cooling stages of the profile.

The apparatus presently preferred for carrying out the method outlined above is a chamber, e.g., of rectangular or cylindrical shape, made of metal or other suitable shielding material which is positioned on a supporting surface of adjustable height, said chamber being open on each end for passage of the shaped profile therethrough, and further being of large enough dimension in cross section to permit unrestricted passage of the profile therethrough. A plurality of spray nozzles are mounted in spaced-apart relationship around the periphery of the chamber with the nozzle openings thereof directed toward the center of the chamber, said nozzles being positioned in series in spaced relationship longitudinally of the chamber, each series of nozzles positioned substantially at one location peripherally about the chamber being connected by a pipe manifold through which fluid cooling medium is supplied thereto from a main conduit line, each of the plurality of nozzles being fitted with a valve for varying the flow of fluid spray therefrom.

Referring now in detail to the drawings, for the practice of the improved cooling method of this invention, the cooling chamber 10 is positioned coaxially of and as close as convenient to the head section 11 of the extruder wherein is positioned a die 12 having the configuration of the desired profile to be produced. The extruder itself may be any one of several types commercially available at present which are presently employed for the extrusion of either thermoplastic resin compounds or powders. As the shaped profile 13 emerges from the extruder die it is introduced into the cooling chamber and guided therethrough atop the supporting jig 14 to the receiving station (not shown). The supporting jig is mounted on any suitable support means which rests on the bottom wall of the chamber, but said jig is not connected to the chamber and is removable therefrom. The jig may be of any suitable design, e.g., a series of rods connected in spaced parallel relationship running longitudinally or transversely of the chamber, as long as the configuration thereof does not impede or obstruct the path of the water spray onto the profile surface. As the profile travels through the chamber, its surface is contacted progressively with water in the form of a fine mist from a plurality of spray nozzles 15 positioned above, below and laterally thereof, said nozzles being spaced in series longitudinally of the chamber, each series being supplied with water by connecting pipe lines from a manifold 16 merging from the main pipe line 17. The nozzles employed may be any type which delivers water as a fine mist or atomized spray at a rate sufficient to cool the profile differentially as needed. In the presently preferred embodiments herein, nozzles delivering water spray at the rate of from 0.5 to 3 gallons per hour have been found particularly suitable as they effectively provide the differential cooling desired while permitting the minimum, most economical utilization of the cooling medium. Each nozzle is fitted with a valve 18 for varying the flow of the water spray therefrom. Depending upon the particular configuration of the shaped profile being fabricated undesired bowing or distortion of the profile is eliminated by utilizing only some of the nozzles to selectively or differentially spray certain surfaces thereof. In this way, all surfaces of the profile can be caused to cool at essentially the same rate. Thus, internal strains which apply stress to the profile with resultant bowing or warping thereof, are not developed. For example, the thicker sections of a profile will not cool normally as fast as its thinner sections. By the method of this invention, these thicker sections accordingly may be selectively sprayed, if desired, to cool them equally as fast as the thinner sections. As pointed out hereinbefore, this selective spraying technique is especially critical during the initial stages of the cooling method, e.g. up to 50% of the total length of the cooling chamber, when the profile has just been extruded and is in a very soft condition. As extruded, the temperature of the profile may typically range from 380° to 425° F. During the latter stages of the cooling cycle, differential spraying of the profile is not especially critical or necessary as the profile has then usually been cooled sufficiently to preclude any significant development of stress therein.

After passage through the chamber, the cooled shaped profile is received and supported by conveyor rolls (not shown), which are in coaxial relation with the supporting jig 14. Thereafter, the profile is cut to the desired length or otherwise fabricated into final form by splicing and/or cutting operations utilized in conventional practice in the industry. Such finishing operations form no part of this invention.

While the present invention has been described hereinabove in a particular embodiment thereof, it is to be understood that other modifications may be employed herein which are within the scope of this invention.

With regard to the spray nozzles positioned in series in spaced relationship peripherally and longitudinally of the cooling chamber, the accompanying drawings illustrating one particular embodiment show, for each series, one nozzle on each of the four sides of the chamber. This nozzle arrangement is completely satisfactory for differentially cooling fairly narrow profiles regardless of the particular configuration thereof. For cooling wider, fairly flat profiles such as rigid house siding, even though such shapes may be of simpler, less intricate configuration, it may be advantageous to include two or more spray nozzles across the top and bottom sides of the chamber at one position longitudially thereof so as to efficiently cool these profiles across their entire width. Likewise, for cooling fairly thick extruded shapes, it may be advantageous to include two or more spray nozzles in vertical series at one position on the side walls of the chamber to efficiently cool such profiles over their entire thickness.

With regard to the size of the cooling chamber, whether it be essentially rectangular, cylindrical or any other convenient shape, it has been found that for conservation of space and economy of operation coupled with satisfactory performance, a cooling chamber ranging from about 3 to 8 feet in length is particularly suitable and practical. However, cooling chambers longer in length may be employed, if desired. For satisfactory performance, the cooling chamber preferably should be at least 8 inches in cross section. Of course, a chamber larger in cross section may also be satisfactorily utilized.

It is to be noted that some entry means, e.g., hinged doors or louvers, preferably is provided on one side of the chamber for access thereto. At the beginning of the extrusion process, when the profile is initially extruded from the shaping die, it is introduced by hand into the cooling chamber. Through the entry means, as illustrated at 19 in FIG. 1, the profile may then be guided likewise by hand atop the supporting jig through the chamber until it reaches the conveyor means for the collecting station at the opposite end of the extrusion line.

Figure 2:
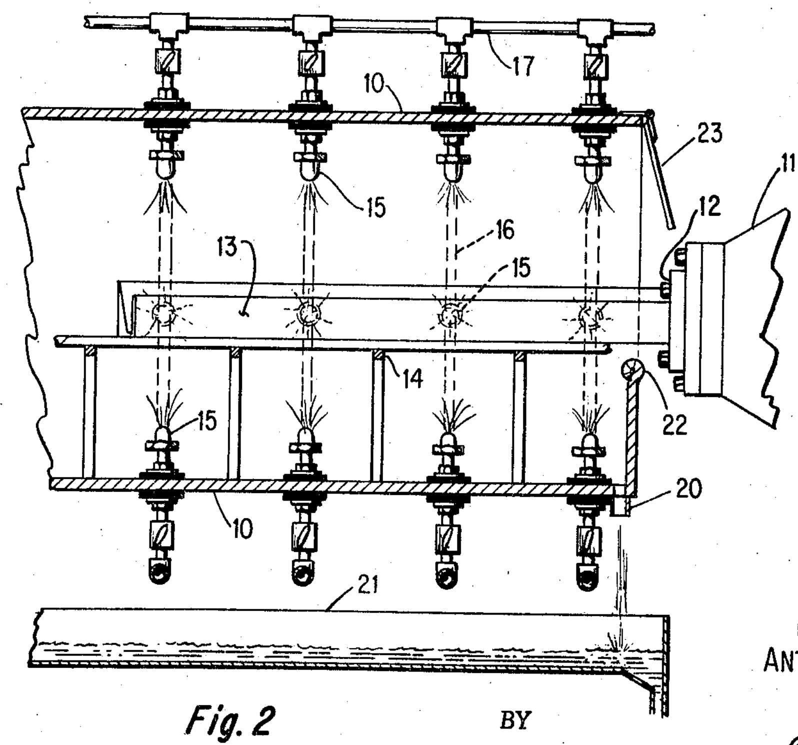
FIG. 2 is a side-view along the line 2—2 of FIG. 1 of the cooling chamber with a vertical side thereof broken away showing the location of the cooling chamber relative to the head section of the extruder and the shaping die therein.

Additionally, means may be provided for collecting the cooling water for reuse. As illustrated in FIG. 2, the cooling chamber may be fitted with an outlet 20 from which the water can drain into a trough 21 in the supporting mechanism for the chamber. The trough may likewise be fitted with an outlet from which the water may be conducted to a sump pump, if desired, for recirculation to the pipe lines supplying the spray nozzles.

Means may also be provided for restricting the water spray within the chamber. For example, an air supply means may be provided at the entrance of the cooling chamber adjacent to the extruder head, as shown in FIG. 2 at 22. From this air barrier, air flow keeps the water mist in the chamber and substantially prevents it from escaping therefrom and contacting the extruder head and shaping die. Although not shown, a similar air supply means may be positioned adjacent to the exit end of the cooling chamber, with the air flow therefrom directed into the chamber. This air supply means may be utilized depending uponthe profile shape, to remove a large portion of the water spray from the surface of said profile as it leaves the chamber. Also, an adjustable shield or plate as shown in FIG. 2 at 23 may be attached to the chamber to provide an additional barrier against water backflow therefrom on to the extruder die.

The cooling method of this invention is characterized by numerous advantages. First, it provides a simple and efficient procedure for cooling extruded shaped profiles of any configuration from thermoplastic resin compositions whereby the finished shapes are not undesirably bowed, warped or distorted. Further, finished profiles of intricate configuration are obtained with no evidence of water-spotting.

Most advantageously, by utilizing the cooling method of this invention, high quality shaped profiles exhibiting no undesirable distortion are obtained from rigid thermoplastic resin powder compositions, which products have not usually been obtained heretofore with present cooling methods. These shaped profile products do not become measurably altered in size during cooling, either in wall thickness or configuration.

The shaped profile products obtained by the method of this invention, particularly the rigid shapes, find wide commercial use, especially as accessory shapes in the construction industry for both outdoor and indoor application. For outdoor use are included accessory shapes, e.g., house siding, corner posts, starter strips, facia, rake, window trim, louvers and soffits. Accessory shapes for indoor application presently include, for example, cove molding, wire covers, door and window trim, ceiling support beams and railing covers. Of course, high-quality shaped profiles are provided for automotive and industrial application.

It is to be understood that, although the invention has been described with specific reference to particular embodiments thereof, it is not to be so limited, since changes and alterations therein may be made which are within the full intended scope of this invention as defined by the appended claims.

What is claimed is:

1. An apparatus for differentially cooling a profile shape extruded from a rigid resin composition as said profile shape is advanced from a shaping die in an unconfined heat-softened condition comprising a chamber open on each end for passage of the extruded profile shape therethrough, a plurality of spray nozzles mounted in spaced-apart relationship around the periphery of said chamber with the nozzle openings directed toward the center of the chamber to deliver liquid cooling spray directly onto the surface of the profile shape, said nozzles being positioned in series in spaced relationship longitudinally of the chamber, each series of nozzles positioned substantially in one location peripherally about the chamber being connected by a pipe manifold through which fluid cooling medium is supplied thereto from a main conduit line, each of the plurality of nozzles being fitted with a valve for varying the flow of fluid spray therefrom.

2. The apparatus of claim 1 wherein the spray nozzles are of a type which delivers the fluid cooling medium as an atomized spray at the rate of from 0.5 to 3 gallons per hour.

References Cited

UNITED STATES PATENTS 2,267,488 12/1941 Becker.
2,708,772 5/1955 Moncrieff.
2,902,716 9/1959 Colombo.
3,057,013 10/1962 Loveless.
3,169,272 2/1965 Maxson.
3,241,186 3/1966 Coons.

WILLIAM J. STEPHENSON, Primary Examiner

U.S. Cl. X.R.

18—6